United States Patent
Costa-Requena et al.

(10) Patent No.: US 10,219,175 B2
(45) Date of Patent: Feb. 26, 2019

(54) ENHANCED MOBILITY MANAGEMENT

(71) Applicant: AALTO-KORKEAKOULUSAATIO, Aalto (FI)

(72) Inventors: Jose Costa-Requena, Helsinki (FI); Jesus Llorente Santos, Espoo (FI); Jukka Manner, Helsinki (FI); Raimo Kantola, Helsinki (FI)

(73) Assignee: AALTO-KORKEAKOULUSAATIO, Aalto (FI)

( * ) Notice: Subject to any disclaimer, the term of this patent is extended or adjusted under 35 U.S.C. 154(b) by 148 days.

(21) Appl. No.: 15/301,747

(22) PCT Filed: Apr. 1, 2015

(86) PCT No.: PCT/FI2015/050231
§ 371 (c)(1),
(2) Date: Oct. 4, 2016

(87) PCT Pub. No.: WO2015/150638
PCT Pub. Date: Oct. 8, 2015

(65) Prior Publication Data
US 2017/0041824 A1 Feb. 9, 2017

(30) Foreign Application Priority Data
Apr. 4, 2014 (EP) .................... 14163587

(51) Int. Cl.
*H04L 12/28* (2006.01)
*H04W 28/06* (2009.01)
(Continued)

(52) U.S. Cl.
CPC ......... *H04W 28/06* (2013.01); *H04L 12/4633* (2013.01); *H04L 41/12* (2013.01);
(Continued)

(58) Field of Classification Search
CPC ......... H04L 41/12; H04L 47/14; H04L 47/24; H04L 12/4633; H04W 28/06; H04W 84/042
(Continued)

(56) References Cited

U.S. PATENT DOCUMENTS 9,843,624 B1 * 12/2017 Taaghol .................. H04L 67/10
2015/0103665 A1 * 4/2015 Kaippallimalil ...... H04W 76/10
370/235

(Continued)

FOREIGN PATENT DOCUMENTS

WO 2013/144747 A1 10/2013

OTHER PUBLICATIONS

Costa-Requena Jose: "SDN integration in LTE mobile backhaul networks", The International Conference on Information Networking 2014 (ICOIN2014), IEEE, Feb. 10, 2014 (Feb. 10, 2014), pp. 264-269, XP032586981, DOI: 10.1109/ICOIN.2014.6799479.
(Continued)

*Primary Examiner* — Thai D Hoang
(74) *Attorney, Agent, or Firm* — Young & Thompson

(57) ABSTRACT

A mobile network component comprises a mobile management entity, MME, a software defined network controller, SDNC. The SDNC is configured to link to MME so as to establish directly Ethernet, MPLS or GRE based internet protocol with mobile QoS priorities mapped into Ethernet, MPLS or GRE transport priorities, IP, communications between evolved node b, eNB, SDN switch, and internet.

16 Claims, 7 Drawing Sheets

(51) Int. Cl.
   *H04L 12/46* (2006.01)
   *H04L 12/24* (2006.01)
   H04L 12/801 (2013.01)
   H04L 12/851 (2013.01)
   H04W 84/04 (2009.01)
(52) U.S. Cl.
   CPC ............. *H04L 47/14* (2013.01); *H04L 47/24* (2013.01); *H04W 84/042* (2013.01)
(58) Field of Classification Search
   USPC ................................. 370/254–255, 400–410
   See application file for complete search history.

(56) References Cited

U.S. PATENT DOCUMENTS

2015/0120890 A1* 4/2015 Ghai ................. H04W 36/0066
                                                     709/221
2017/0303139 A1* 10/2017 Karandikar ........... H04W 16/18

OTHER PUBLICATIONS

ETSI GS NFV: "ETSI GS NFV 001 V1.1.1 Network Functions Virtualisation (NFV); Use Cases", Oct. 1, 2013 (Oct. 1, 2013), Sophia Antipolis France, pp. 1-50, XP055143758, Retrieved from the Internet <URL:http://www.etsi.org/deliver/etsi_gs/NFV/001_099/001/01.01.01_60/gs_NFV001v010101p.pdf> [retrieved on Oct. 1, 2014].
International Search Report, dated Jun. 30, 2015, from corresponding PCT application.

\* cited by examiner

ENHANCED MOBILITY MANAGEMENT

TECHNICAL FIELD

The present invention relates generally to a mobile network. More particularly, the present invention relates to a mobile network component, a method for a mobile network component, and a computer program for a mobile network component.

BACKGROUND

Traditional wireless networks provide communication between base stations and the core network over the backhaul via point-to-point transport fiber, microwave etc.

It is expected that by the end of 2013, the number of mobile devices will surpass the total population, and by 2017 there will be nearly 1.4 mobile devices per user. Indeed, by 2013, the number of base stations supporting wireless networks will increase to 5.7 million, from 3.6 million in 2007.

Moreover, the users demand higher bit rates for accessing content, for example video, which should be delivered at higher speed and better quality. In order to keep with those demands while keeping the cost of network operation, OPEX and new capital investments, CAPEX under reasonable limits, network operators have to look for more cost efficient technologies.

The basic problem is that mobile traffic growth is expected to increase 100 fold by 2020. The long term evolution, LTE, mobile networks do not have sufficient flexibility to adapt to the traffic demands.

The current LTE network is based on vertical integration of LTE functionality with hardware, HW. Therefore, current way for operators to manage of traffic demands consists of over dimensioning the network with additional HW that is only needed during peak times, while the rest of the time this equipment remains idle. This approach to cover the traffic demands leads to increase in the OPEX and the CAPEX. Thus, the network is over dimensioned to handle future traffic peaks which results in waste of resources.

There is a need to overcome one or more of the problems as set forth above.

SUMMARY

It is an object of the present invention to provide a mobile network component, a method for the mobile network component, and a computer program for the mobile network component. This object can be achieved by the features defined in the independent claims. Further enhancements are characterized by the dependent claims.

One embodiment is directed to a mobile network component, comprising:
a mobile management entity, MME;
a software defined network, SDN, controller, SDNC;
a quality of service, QoS, tagger configured to map mobile QoS priorities into a layer 2 or a layer 3 tunneling transport;
wherein the SDNC is configured to link to MME so as to establish directly the layer 2 or the layer 3 tunneling transport based internet protocol, IF, communications between evolved node b, eNB, and an SDN switch using the mobile QoS priorities mapped into the layer 2 or the layer 3 tunneling transport.

One embodiment is directed to a method for a mobile network component, comprising:

linking a software defined network, SDN, controller, SDNC, to a mobile management entity, MME;
mapping mobile quality of service, QoS, priorities into a layer 2 or layer 3 transport; and
establishing directly the layer 2 or the layer 3 transport based IP communications between an evolved node b, eNB, and an SDN switch using the mobile QoS priorities mapped into the layer 2 or the layer 3 transport.

One embodiment is directed to a computer program, comprising: programmable software codes configured to cause the program to
link a software defined network, SDN, controller, SDNC, to a mobile management entity, MME;
map mobile quality of service, QoS, priorities into a layer 2 or layer 3 transport; and
establish directly the layer 2 or the layer 3 transport based IF communications between an evolved node b, eNB, and an SDN switch using the mobile QoS priorities mapped into the layer 2 or the layer 3 transport.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment(s).

BRIEF DESCRIPTION OF THE DRAWINGS

The accompanying drawings illustrate presently preferred exemplary embodiments of the disclosure, and together with the general description given above and the detailed description of the preferred embodiments given below, serve to explain, by way of example, the principles of the disclosure.

DETAILED DESCRIPTION

Figure 1:
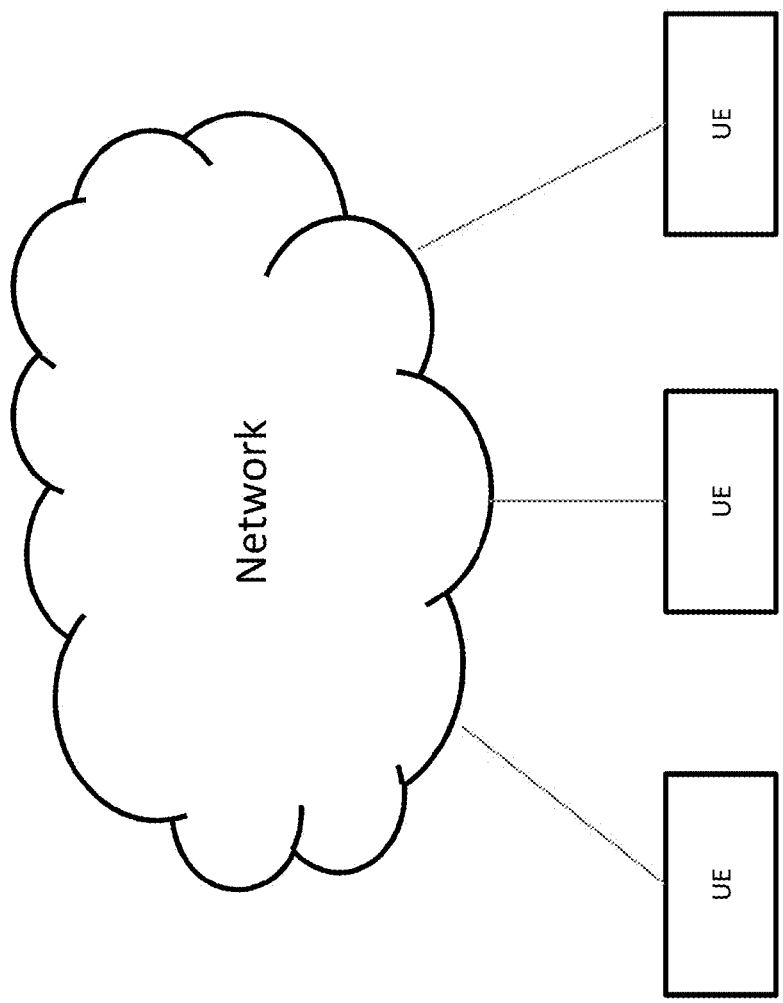
FIG. 1 is a schematic diagram of a mobile communications system according to an example of the present invention.

Please refer to FIG. 1, which is a schematic diagram of a mobile communication system according to an example of the present invention. The mobile communication system, such as a General Packet Radio Service, GPRS, system, a Global System for Mobile communications, GSM, system, a Universal Mobile Telecommunications System, UMTS, a Long Term Evolution, LTE, system, a Long Term Evolutionadvanced, LTE-A, system, or other mobile communication systems, is briefly composed of a network and a plurality of user equipments, UEs. In FIG. 1, the network and the UEs are simply utilized for illustrating the structure of the wireless communication system.

For the LTE system or other mobile communication systems alike, the network can be referred as to an E-UTRAN (evolved-UTRAN) comprising a plurality of evolved Node-Bs, eNBs, and relays. The network may also comprise a mobility management entity, MME, which is responsible for the delivery of data packets to the UEs back and forth within its geographical service area, including packet routing and transfer, mobility management (attach/detach and tracking area management), session management (PDN connection establishment/disconnect), logical link management, and authentication and charging functions. In addition, the MME may serve as a local mobility anchor for interworking with other radio access technologies, RATs (e.g. GSM and UMTS).

The UEs can be devices such as mobile phones, laptops, tablet computers, electronic books, and portable computer systems. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
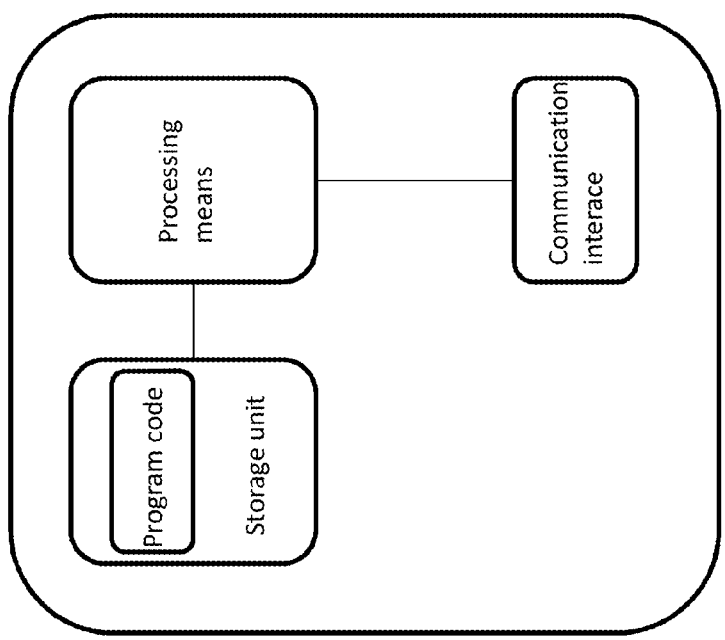
FIG. 2 is a schematic diagram of a communication device according to an example of the present invention.

Please refer to FIG. 2, which is a schematic diagram of a communication device according to an example of the present invention. The communication device can be a mobile network component/entity or the UE shown in FIG. 1, but is not limited herein. The communication device may include a processing means such as a microprocessor or Application Specific Integrated Circuit (ASIC), a storage unit and a communication interfacing unit. The storage unit may be any data storage device that can store a program code, accessed by the processing means. Examples of the storage unit include but are not limited to a subscriber identity module (SIM), read-only memory (ROM), flash memory, random-access memory (RAM), CD-ROM/DVD-ROM, magnetic tape, hard disk, and optical data storage device. The communication interfacing unit is preferably a radio transceiver and can transmit and receive wireless signals (e.g., messages or packets) according to processing results of the processing means The processes can be implemented by the communication device and may be compiled into the program code to instruct the processing means to execute the steps of the processes. Cloud technology can be used to consolidate mobile broadband control plane systems and applications into virtual machines running in private or public clouds. Network resources, for example the communication device of FIG. 2, to these virtual instances are mapped through a virtualized network framework that ensures isolation between different systems using the same physical network.

An embodiment of the invention relates to an integration of SDN into LTE network. An MME is integrated with controller functionality, which includes the SDN controller. Thereby, communications is simplified and is based on SDN switches. Furthermore, the control plane is also simplified by merging LTE network elements such as MME, serving/packet gateway, S/P-GW, into a single network component. The single network component is referred to as enhanced MME, eMME. Moreover, the eMME is virtualized. Multiple instances can be launched in data centers to manage the simplified data plane.

Consequently, for supporting the increasing traffic demand, the LTE network elements can be moved into a cloud with commodity HW. The eMME includes the entirely virtualization of the MME to run on the cloud. The eMME also includes the consolidation of certain LTE network elements. The eMME comprises a single component. Consequently, the eMME includes the MME functionality as defined in 3GPP but also SDN controller functionality as well as PCRF and P/S-GW functions.

An embodiment allows to increase the network throughput and optimal usage of the resources with minor investment i.e. acquisition of the enhanced mobility management entity. The backwards compatibility of the eMME allows deploying the eMME in parts of the network, wherein it can coexist with existing LTE standard network elements, and at the same time use enhanced SDN enabled transport network. Moreover, the eMME integrates functionality from several LTE network elements. Thus, a single network element manages the entire LTE network and can reduce OPEX.

Figure 3:
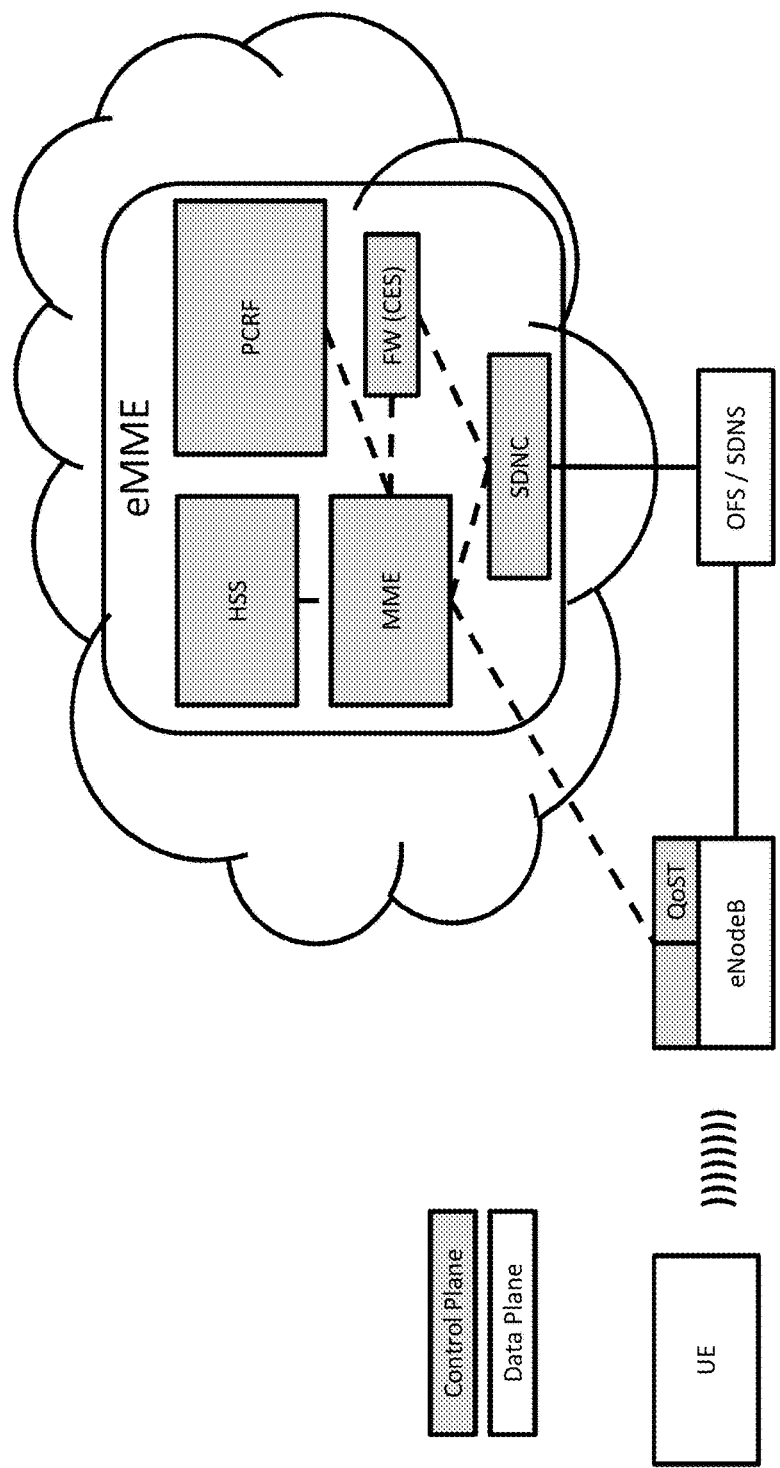
FIG. 3 is a schematic diagram of an enhanced mobile management entity according to an exemplary embodiment of the present invention.

FIG. 3 shows an embodiment of the invention, which is configured to the integration of mobility with SDNC, and which is included as part of MME network element. In mobile networks, mobility is a major requirement, which needs to be handled properly with minimum delay and reduced signaling. The eMME comprises a MME of LTE. The eMME is coupled with SDN controller, SDNC, a home subscriber server, HSS, a policy control and charging function, PCRF, and the eNB. These connections are conducted by a control plane as illustrated by a halftone and dashed lines in the FIG. 3. SDNC is coupled with open flow switch, OFS by a data plane. OFS may be alternatively referred to as an SDN switch, SDNS. OFS is coupled with the eNB by a data plane. User equipment, UE, is wirelessly coupled with the eNB.

Integrating SDNC functionality with MME provides a smooth integration in the long term as well as disruptive solution in mobile networks. The data plane is configured for the mobile specific requirements. The data plane is optimized for high speed and flow-level processing using open flow, OF. In SDMN, the control plane is moved out of the basic networking elements into centralized servers—these servers resemble classical anchor points used on many mobility protocols. Consequently, SDNC and functionalities of a current S/P-GW is integrated in the same logical network element together with the MME functionality. Therefore, the current S/P-GW functionality disappears and instead a SDN based switched is used. This is configured to add flexibility and value to networking at different increments and support the gradual introduction of high network throughputs, more optimal flow management and traffic engineering possibilities.

Figure 4:
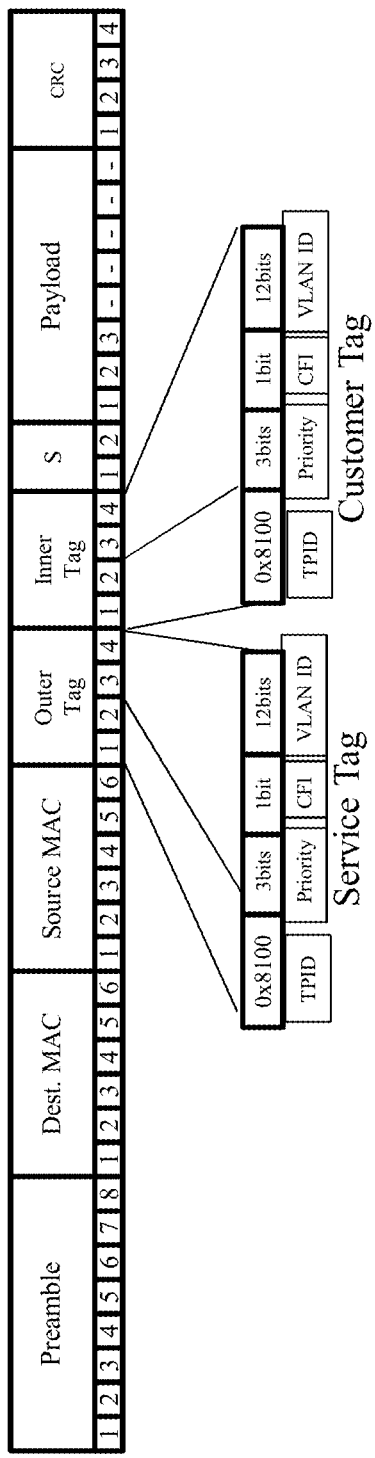
FIG. 4 illustrates an example of a communication structure according to an exemplary embodiment of the present invention where the QoS tagger maps the mobile QoS priorities into Layer 2 tunneling such as Ethernet.
Figure 5:
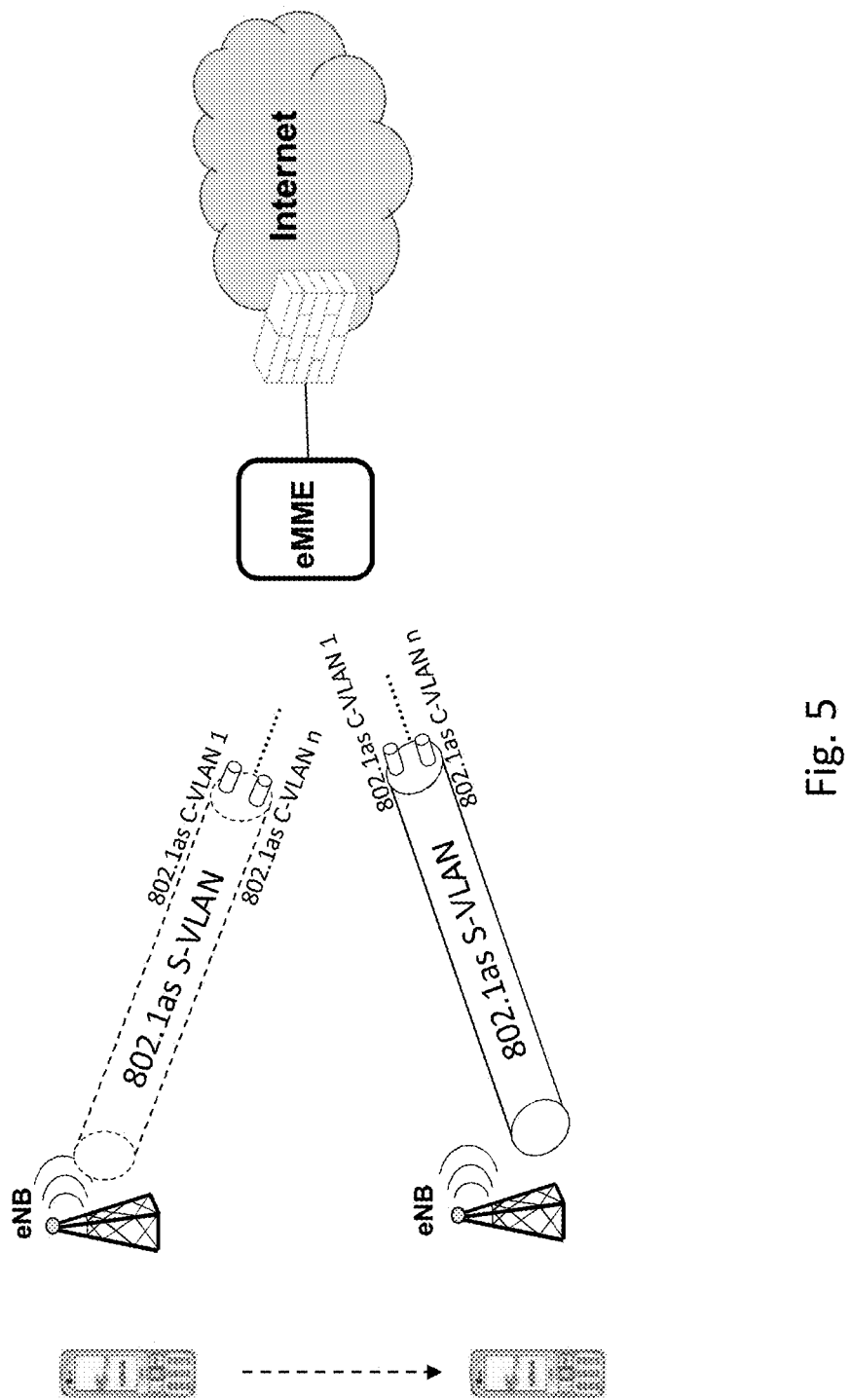
FIG. 5 illustrates virtual local area network, VLAN, tunneling between eNodeBs and eMME using Layer 2 tunneling Ethernet with the proposed QoS mapping between mobile QoS priorities and Layer 2 priority tags.

In addition to the SDNC integration with MME this embodiment includes the Quality of Service, QoS, tagger functionality that maps the mobile QoS priorities into Layer 2 or Layer 3 transport networks such as Ethernet, Multiprotocol Label Switching, MPLS, Generic Routing Encapsulation, GRE or other IP based tunneling, as show in FIG. 4 and FIG. 5. The QoS tagger is connected with the MME. The QoS tagger is located in the eNB, as shown in the FIG. 3

Mobility is a critical aspect of mobile networks. Mobility requires specific functionality in the network elements. A linkage between the MME and the SDNC within the eMME enables that the time-constrained functions of mobility are handled efficiently from the SDNC. This integration provides efficient handover management in SDMN.

This architecture leads to an optimized transport network as well as scalable control plane, which converges into the single network component the eMME—the MME with embedded SDNC functions. The eMME is configured to run on either a dedicated HW or as a cloud service. The could service is configured so as to allow launching multiple instances as needed to overcome scalability of having all functionality into single network element.

With respect to the communications, the communication comprises data flows between the entities, eNB, eMME, and OFS. An open flow controller, OFC, adds and removes flow entries from a flow table. Consequently, mobility management requires concurrent updates in the flow table. The eMME is configured to receive the update. An entry in the flow table has three fields: a packet header to define the flow, an action that defines packet processing, and finally statistics, such as number of bytes and packets in each flow. Referring now to FIG. 4, there is being illustrated a communication structure according to an exemplary embodiment. An embodiment of the invention adds a communications structure to the network architecture. This can be added, in addition to the eMME, so that the eMME is configured to communicate accordingly. This applies for eNB and OFSC as well. An embodiment of the invention uses a communication according to 802.1ad. An embodiment of the invention uses 802.1ad to allow double tagging in Ethernet switches. For example in the OFS and eNB. FIG. 4 illustrate the double tagging by a server tag and a customer tag.

The double tagging allows having up to $2^{12}$ service tags as the outer tunnel and $2^{12}$ customer tags for inner tunnels. FIG. 5 illustrates virtual local area network, VLAN, tunneling between eNBs and eMME. These outer virtual local area networks, VLANs can be used for establishing tunnels between the eNBs located in the same Ethernet segment. Those VLANs established from the eNBs can be assigned to different mobile virtual network operators, MVNO. The $2^{12}$ tunnels can serve 10 MVNO in an area of 400 eNBs.

Figure 6:
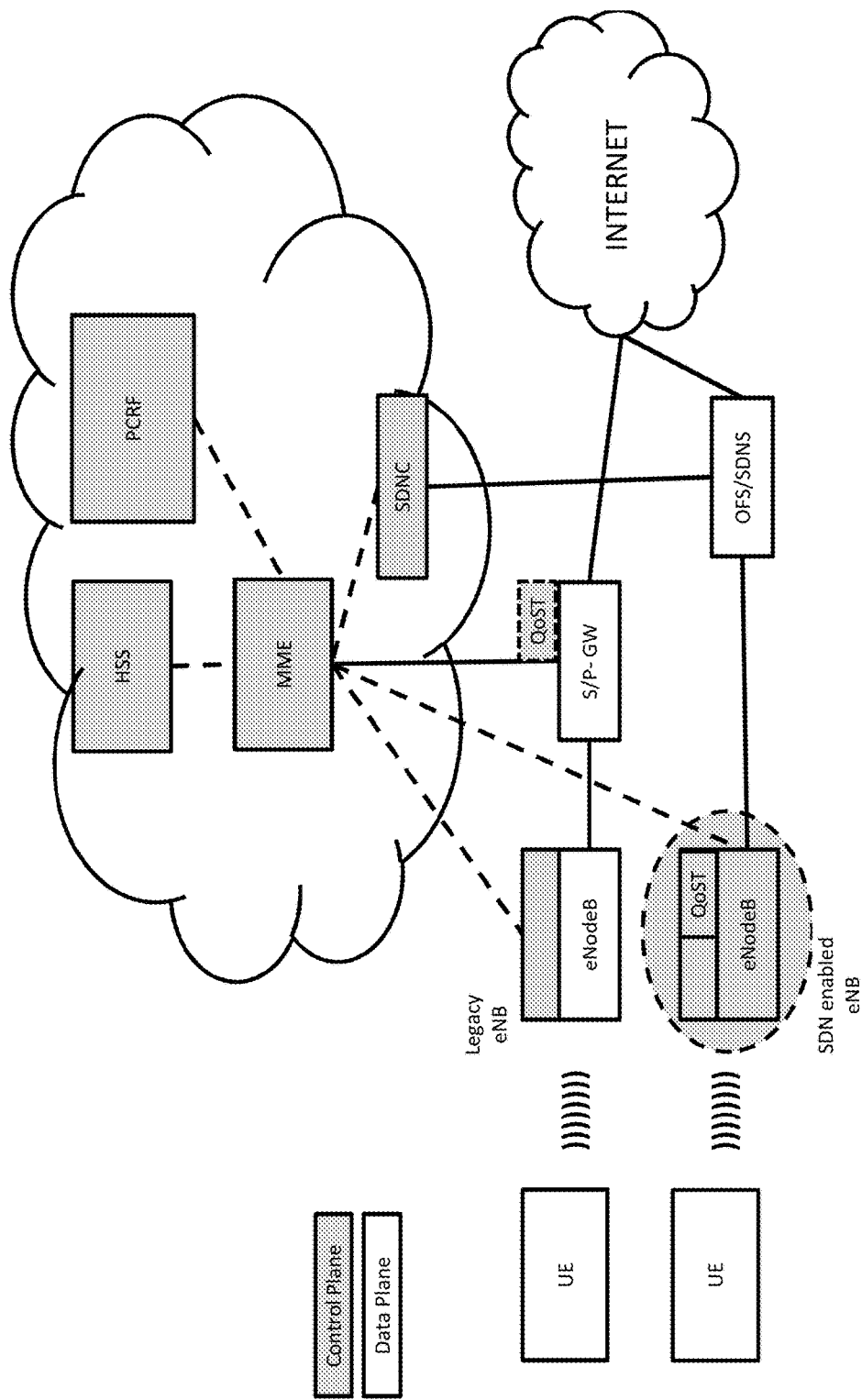
FIG. 6 illustrates an example, wherein the eMME is configured with the legacy eNodeB and SDN enabled eNodeB.

Integrating the SDNC functionality with the MME and current S/P-GW into a single network component, eMME, can simplify the network functionality. This results in the next disruption where data plane is managed from a single element, eMME. According to an embodiment of the invention, an evolution towards this architecture can be done progressively where the MME will keep receiving the signaling through S1-MME interface and will proceed with the current standard process and establish GTP tunnels between eNodeB and S/P-GW. FIG. 6 depicts an example, wherein the eMME is configured with the legacy eNB and SDN enabled eNB accordingly. The eMME is coupled with legacy SP/-GW and SDN enabled OFC. Optionally the QoS tagger can be located in the legacy S/P-GW. Therefore eMME is capable of operating with both legacy LTE and SDN enabled LTE. For example, a handover and interoperability between these systems is enabled.

According to an embodiment the network comprises both eNodeB and SDN switches. Based on the eNB and SDN switch, a communication can be directly established at layer 2 without GTP tunneling. For example, the MME, when receiving the signaling from the eNB through the S1-MME interface, can establish the connection with the termination SDN switch over L2 using TUN interfaces.

Figure 7:
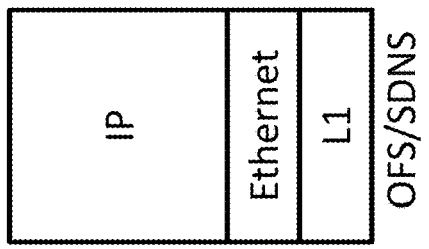
FIG. 7 illustrates a networking stack according to an exemplary embodiment of the invention.
Figure 7:
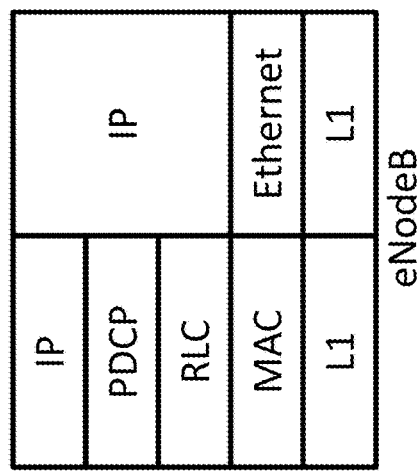
Figure 7:
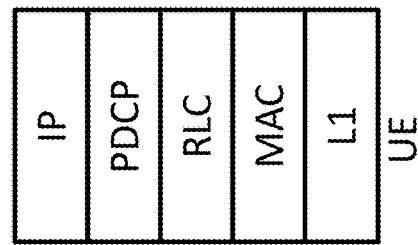

The usage of communication protocol 802.1ad in the backhaul and integration of the MME with the SDNC allows the removal of the GTP. This results in the simplification of the communication protocol stack in the eNodeB that terminates the radio layers and includes Ethernet switch towards the rest of the network in the backhaul. Moreover, the known S/P-GW is simplified after removing the GTP and comprises simple Ethernet switch, the OFS and IP router towards the public Internet. In this architecture the mobility is performed by the SDNC. FIG. 7 illustrates a networking stack according to an exemplary embodiment of the invention. GTP is not required and IP based communication can be directly applied between eNB, eMME and OFS.

According to an embodiment, the MME is configured to maintain the current networking stack. The changes in the data plane, while keeping the signaling in the MME to support legacy eNB, allows a transition between the legacy system and the SDN based system. Consequently, the eMME is configured to manage current network elements, for example the current eNodeB and the S/P-GW. Furthermore the eMME is also configured to the integration with the SDN allowing managing the eNB, the OFS and the SDNC, wherein the GTP has been removed.

In addition to the integration of the MME with the SDN and the simplification of the backhaul network by removing GTP from the network elements, the network can be flattered. The network elements are normally located in the core network. Instead the network is configured to be flattered so that the network elements are located closer to the eNB in the backhaul. This allows deployment of standalone access networks with their own network elements. The coordination of the multiple access networks is configured using centralized database. The handover between eMME located on each access network is done through the S10 interface. The flatter architecture allows the usage of 802.1ad for each access networks.

It will be apparent to those skilled in the art that various modifications and variations can be made to the apparatus and method. Other embodiments will be apparent to those skilled in the art from consideration of the specification and practice of the disclosed apparatus and method. It is intended that the specification and examples be considered as exemplary only, with a true scope being indicated by the following claims and their equivalents.

The invention claimed is:
1. A mobile network component (eMME), comprising:
a mobile management entity (MME);
a software defined network controller (SDNC); and
a quality of service (QoS) tagger configured to map mobile QoS priorities into a layer 2 or a layer 3 tunneling transport;
wherein the SDNC is coupled with a software defined network (SDN) switch,
wherein the SDNC is configured to link to the MME so as to establish directly the layer 2 or the layer 3 tunneling transport-based internet protocol (IP) communications between an evolved node b (eNB) and the SDN switch using the mobile QoS priorities mapped by the QoS tagger into the layer 2 or the layer 3 tunneling transport,
wherein the MME is located on a cloud or a backhaul,
wherein the QoS tagger is located in the eNB or in a service/packet gateway (S/P GW) and is connected with the MME, and
wherein the layer 2 or layer 3 tunneling transport-based IP communications comprise ethernet, multiprotocol label switching (MPLS), or generic routing encapsulation (GRE).

2. The mobile network component of claim 1, wherein the SDNC is configured to link to MME so as to establish IP communications further to internet by the SDN switch.

3. The mobile network component of claim 1, wherein the communication is configured to be established without general packet radio service tunneling protocol (GTP).

4. The mobile network component of claim 1, further comprising:

a home subscriber server (HSS), and a policy control and charging rules function (PCRF).

5. The mobile network component of claim 1, wherein the mobile network component comprises a single element in a mobile network.

6. The mobile network component of claim 1, wherein the ethernet is based on 802.1ad structure.

7. The mobile network component of claim 1, further comprising:
   double tagging including a service tag and a customer tag.

8. The mobile network component of claim 1, wherein a service tag is configured to an outer tunnel and customer tags are configured to an inner tunnel.

9. The mobile network component of claim 1, wherein an outer tunnel comprises a virtual local area network (VLAN) MPLS or GRE tunnel, which is configured for establishing the tunnel between eNodeBs located in the same ethernet, MPLS or GRE segment.

10. The mobile network component of claim 1, wherein the mobile network component is configured to operate with legacy LTE system based on the GTP and the SDN based LTE without the GTP.

11. The mobile network component of claim 1, further comprising:
   a service/packet gateway configured to the GTP.

12. The mobile network component of claim 1, wherein the SDN switch comprises: an ethernet switch, an MPLS switch or GRE tunnel endpoint, and an IP router.

13. The mobile network component of claim 1, wherein a protocol stack of said communications consist of L1, Ethernet, MPLS or GRE, and IP.

14. The mobile network component of claim 1, wherein the mobile network component is configured to be operated by a cloud-based network.

15. A method for the mobile network component (eMME) recited by claim 1, comprising:
   linking a software defined network (SDN) controller, coupled with an SDN switch, to a mobile management entity (MME);
   mapping, by a quality of service (QoS) tagger, mobile QoS priorities into a layer 2 or a layer 3 transport; and
   establishing directly the layer 2 or the layer 3 transport based internet protocol, IP, communications between an evolved node b (eNB) and the SDN switch using the mobile QoS priorities mapped by the QoS tagger into the layer 2 or the layer 3 transport,
   wherein the MME locates on a cloud or a backhaul,
   wherein the QoS tagger locates in the eNB or in a service/packet gateway (S/P GW), and is connected with the MME, and
   wherein the layer 2 or layer 3 tunneling transport-based IP communications comprise ethernet, multiprotocol label switching (MPLS), or generic routing encapsulation (GRE).

16. A non-transitory computer-readable medium having computer executable instructions encoded thereon that, when executed by a processor, cause a mobile network component to perform the method of claim 15.

* * * * *